US009019216B2

(12) United States Patent
Sakurai et al.

(10) Patent No.: US 9,019,216 B2
(45) Date of Patent: Apr. 28, 2015

(54) TOUCH PANEL AND METHOD OF DETECTING COORDINATE POSITION

(75) Inventors: Satoshi Sakurai, Tokyo (JP); Nobuyoshi Shimizu, Tokyo (JP); Shiro Hirota, Tokyo (JP); Norio Endo, Tokyo (JP)

(73) Assignee: Fujitsu Component Limited, Tokyo (JP)

( * ) Notice: Subject to any disclaimer, the term of this patent is extended or adjusted under 35 U.S.C. 154(b) by 570 days.

(21) Appl. No.: 13/356,775

(22) Filed: Jan. 24, 2012

(65) Prior Publication Data
US 2013/0021089 A1 Jan. 24, 2013

(30) Foreign Application Priority Data
Jan. 27, 2011 (JP) ................. 2011-015526

(51) Int. Cl.
G06F 3/041 (2006.01)
G06F 3/044 (2006.01)
G06F 3/045 (2006.01)

(52) U.S. Cl.
CPC ............... *G06F 3/044* (2013.01); *G06F 3/045* (2013.01); *G06F 2203/04106* (2013.01)
USPC .......... 345/173; 345/174; 178/18.01

(58) Field of Classification Search
CPC ... G06F 3/04865; G06F 3/0487; G06F 3/044; G06F 3/04875; G06F 3/045
USPC ............ 345/173–179; 178/18.01–18.04; 349/56, 104
See application file for complete search history.

(56) References Cited

U.S. PATENT DOCUMENTS

| 4,622,437 | A | * | 11/1986 | Bloom et al. ............... 178/18.05 |
| 4,853,498 | A | * | 8/1989 | Meadows et al. ............. 345/174 |
| 5,815,141 | A | * | 9/1998 | Phares ........................ 345/173 |
| 5,955,198 | A | * | 9/1999 | Hashimoto et al. ........... 428/414 |
| 6,058,485 | A | * | 5/2000 | Koziuk et al. ................ 713/320 |
| 8,599,565 | B2 | * | 12/2013 | Kondoh et al. ............... 361/748 |
| 2005/0139398 | A1 | | 6/2005 | Endo |
| 2008/0316182 | A1 | * | 12/2008 | Antila et al. .................. 345/173 |
| 2009/0009487 | A1 | * | 1/2009 | Nishitani et al. ............. 345/174 |
| 2009/0096762 | A1 | | 4/2009 | Hinata |
| 2010/0091038 | A1 | * | 4/2010 | Konno et al. ................. 345/653 |
| 2010/0271322 | A1 | * | 10/2010 | Kondoh et al. ............... 345/173 |

FOREIGN PATENT DOCUMENTS

| EP | 2026179 | 2/2009 |
| JP | 2004-272722 | 9/2004 |
| JP | 2005-196280 | 7/2005 |
| JP | 3132106 U | 5/2007 |
| JP | 3139196 U | 1/2008 |
| JP | 2008-225980 | 9/2008 |

(Continued)

Primary Examiner — Kimnhung Nguyen
(74) Attorney, Agent, or Firm — IPUSA, PLLC

(57) ABSTRACT

Disclosed is a touch panel including an upper conductive layer; a lower conductive layer facing the upper conductive layer with an interval between the upper conductive layer; a capacitive sensing unit that detects a coordinate position by a capacitive coupling under a condition where a predetermined electric potential is applied to the upper conductive layer; and a resistive sensing unit that detects a coordinate position based on an electric potential at a position where the upper conductive layer and the lower conductive layer contact under a condition where a potential gradient is generated on either one of the upper conductive layer and the lower conductive layer.

20 Claims, 16 Drawing Sheets

(56) References Cited

FOREIGN PATENT DOCUMENTS

| JP | 2008-293129 | 12/2008 |
| JP | 3150179 U | 4/2009 |
| JP | 2009-116849 | 5/2009 |
| JP | 2009-129100 | 6/2009 |
| JP | 2009-265759 | 11/2009 |

* cited by examiner

TOUCH PANEL AND METHOD OF DETECTING COORDINATE POSITION

BACKGROUND OF THE INVENTION

1. Field of the Invention

The present invention relates to a touch panel and a method of detecting a coordinate position.

2. Description of the Related Art

A touch panel is an input device usually provided in front of a display and capable of inputting data. As a user can directly input data based on information visually grasped by viewing the display through the touch panel, the touch panel is used in various ways.

A resistive touch panel or a capacitive touch panel is widely known.

For the resistive touch panel, transparent conductive layers are respectively formed on an upper conductive substrate and on a lower conductive substrate where the transparent conductive layers are positioned to face each other. When force is applied to a point of the upper conductive substrate to have the transparent conductive layers of the upper conductive substrate and the lower conductive substrate contact at the point where a potential gradient is generated on one of the transparent conductive layers, a coordinate position of the pushed point can be detected by reading an electric potential of the other of the transparent conductive layers.

Resistive touch panels mainly include a four-wire type, a five-wire type and a diode type. For the four-wire type, electrodes for applying potential gradients in an X-axis direction and in a Y-axis direction are respectively provided on one and the other of the upper conductive substrate and the lower conductive substrate (see patent document 1, for example). For the five-wire type, electrodes for applying potential gradients in both the X-axis direction and the Y-axis are provided on the lower conductive substrate, and the upper conductive substrate functions as a probe to read an electric potential (see patent document 2, for example). For the diode type, diodes are provided on the lower conductive substrate. Further, seven electrodes in total including two electrodes for applying a voltage and four electrodes for monitoring an electric potential provided on the lower conductive substrate and an electrode that functions as a probe to detect an electric potential provided on the upper conductive substrate are provided. Therefore, the diode type is also called a seven-wire type (see patent document 3, for example).

The capacitive touch panel detects a coordinate position of a touched point by detecting a current that flows through a transparent electrode or the like when a finger or the like touches or approaches the touch panel.

The capacitive touch panel detects a coordinate position by a capacitive coupling and therefore, the coordinate position can be detected just by touching, not necessarily pushing or pressing. However, when using an insulating material to touch the touch panel, the coordinate position cannot be detected. The resistive touch panel can detect a coordinate position even when an insulating material or the like is used for pushing the touch panel. However, it is necessary to push the touch panel with a certain force because the coordinate position can only be detected when the transparent conductive layer that functions as an upper resistive layer and the transparent conductive layer that functions as a lower resistive layer make contact.

A touch panel where a capacitive touch panel and a resistive touch panel are stacked so that both of the characteristics of the capacitive touch panel and the resistive touch panel are included is disclosed (see patent documents 4 or 5).

PATENT DOCUMENTS

[Patent document 1] Japanese Laid-open Patent Publication No. 2004-272722
[Patent document 2] Japanese Laid-open Patent Publication No. 2008-293129
[Patent document 3] Japanese Laid-open Patent Publication No. 2005-196280
[Patent document 4] Japanese Utility Model No. 3132106
[Patent document 5] Japanese Utility Model No. 3139196

SUMMARY OF THE INVENTION

However, for the touch panel as such, there are some problems including increased thickness and higher costs due to two kinds of touch panels being stacked.

The present invention is made in light of the above problems, and provides a thinner touch panel having both the characteristics of a capacitive touch panel and a resistive touch panel meaning that a coordinate position can be detected just by touching and the coordinate position can also be detected by using a device of any material with a lower cost and a method of detecting a coordinate position using the touch panel.

According to an embodiment, there is provided a touch panel including, an upper conductive layer; a lower conductive layer facing the upper conductive layer with an interval between the upper conductive layer; a capacitive sensing unit that detects a coordinate position by a capacitive coupling under a condition where a predetermined electric potential is applied to the upper conductive layer; and a resistive sensing unit that detects a coordinate position based on an electric potential at a position where the upper conductive layer and the lower conductive layer contact under a condition where a potential gradient is generated on either one of the upper conductive layer or the lower conductive layer.

According to another embodiment, there is provided a method of detecting a coordinate position by a touch panel including an upper conductive layer and a lower conductive layer facing the upper conductive layer with an interval between the upper conductive layer, including, detecting, by a capacitive sensing mode, a coordinate position by a capacitive coupling under a condition where a predetermined electric potential is applied to the upper conductive layer; and detecting, by a resistive sensing mode, a coordinate position based on an electric potential at a position where the upper conductive layer and the lower conductive layer contact under a condition where a potential gradient is generated on either one of the upper conductive layer or the lower conductive layer.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
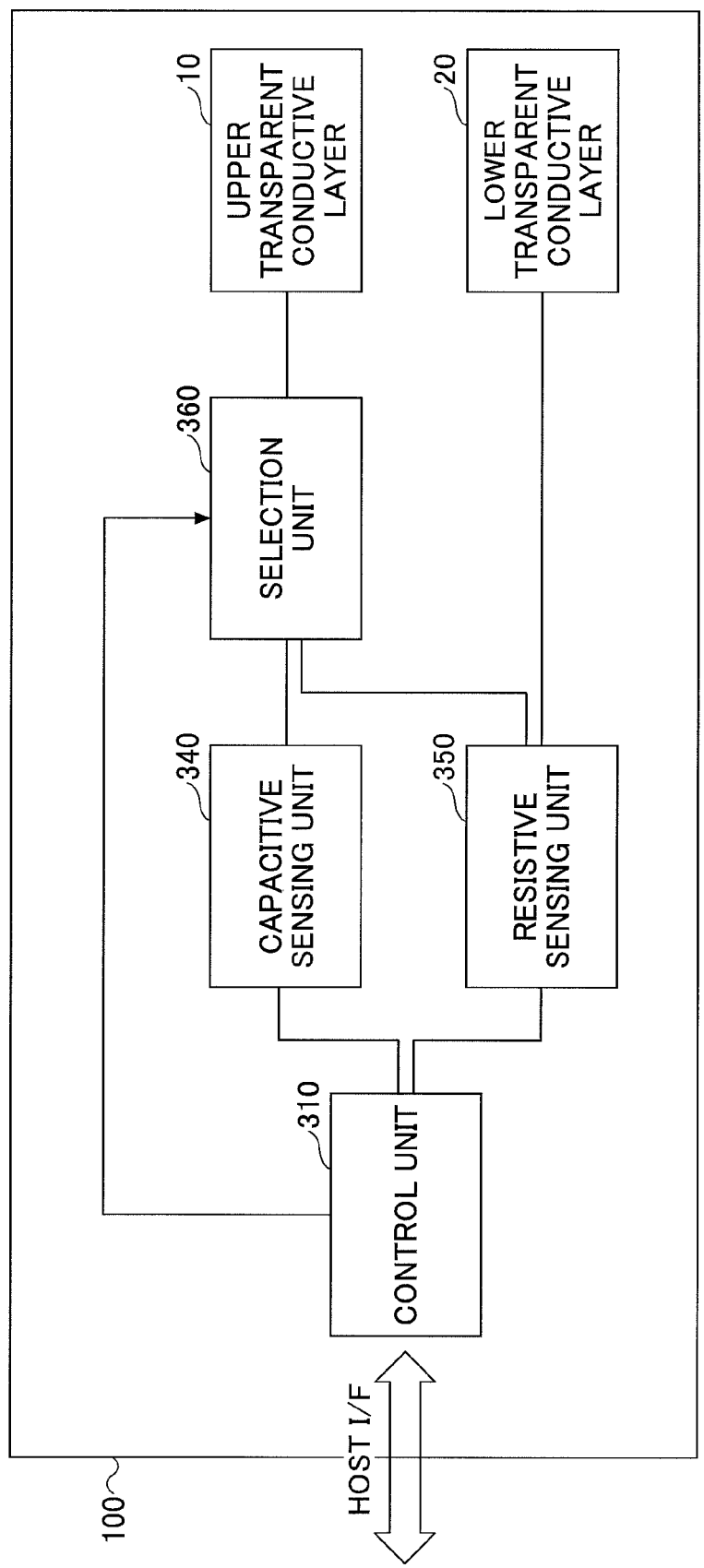
FIG. 1 is a block diagram showing an example of a structure of a touch panel according to an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described below with reference to drawings.

It is to be noted that, in the explanation of the drawings, the same components are given the same reference numerals, and explanations are not repeated.

FIG. 1 is a block diagram showing an example of a structure of a touch panel 100 according to an embodiment.

The touch panel 100 includes an upper transparent conductive layer 10 (an upper conductive layer) and a lower transparent conductive layer 20 (a lower conductive layer) facing the upper transparent conductive layer 10 with an interval between the upper transparent conductive layer 10.

The touch panel 100 further includes a control circuit composed of a capacitive sensing unit 340, a resistive sensing unit 350, a selection unit 360 and a control unit 310.

The capacitive sensing unit 340 is connected to the upper transparent conductive layer 10 via the selection unit 360. The capacitive sensing unit 340 detects a coordinate position by a capacitive coupling under a condition where a predetermined electric potential is applied to the upper transparent conductive layer 10.

The resistive sensing unit 350 is connected to the upper transparent conductive layer 10 via the selection unit 360 and also connected to the lower transparent conductive layer 20. The resistive sensing unit 350 detects a coordinate position based on an electric potential at a position where the upper transparent conductive layer 10 and the lower transparent conductive layer 20 contact under a condition where a potential gradient is generated on either one of the upper transparent conductive layer 10 and the lower transparent conductive layer 20.

The selection unit 360 is connected to the capacitive sensing unit 340 and the resistive sensing unit 350. The selection unit 360 selects either one of the capacitive sensing unit 340 or the resistive sensing unit 350 to detect an electric potential of the upper transparent conductive layer 10 by detecting a coordinate position under control of the control unit 310.

The control unit 310 controls the entirety of the touch panel 100. Concretely, the control unit 310 performs detection of the coordinates of a touched position of the touch panel 100 based on information obtained by the capacitive sensing unit 340 and the resistive sensing unit 350. The control unit 310 is connected to a host computer (not shown in the drawings) or the like via a host interface (a host I/F) and sends the information to the host computer.

(First Embodiment)

A touch panel of a first embodiment will be explained.

Figure 2:
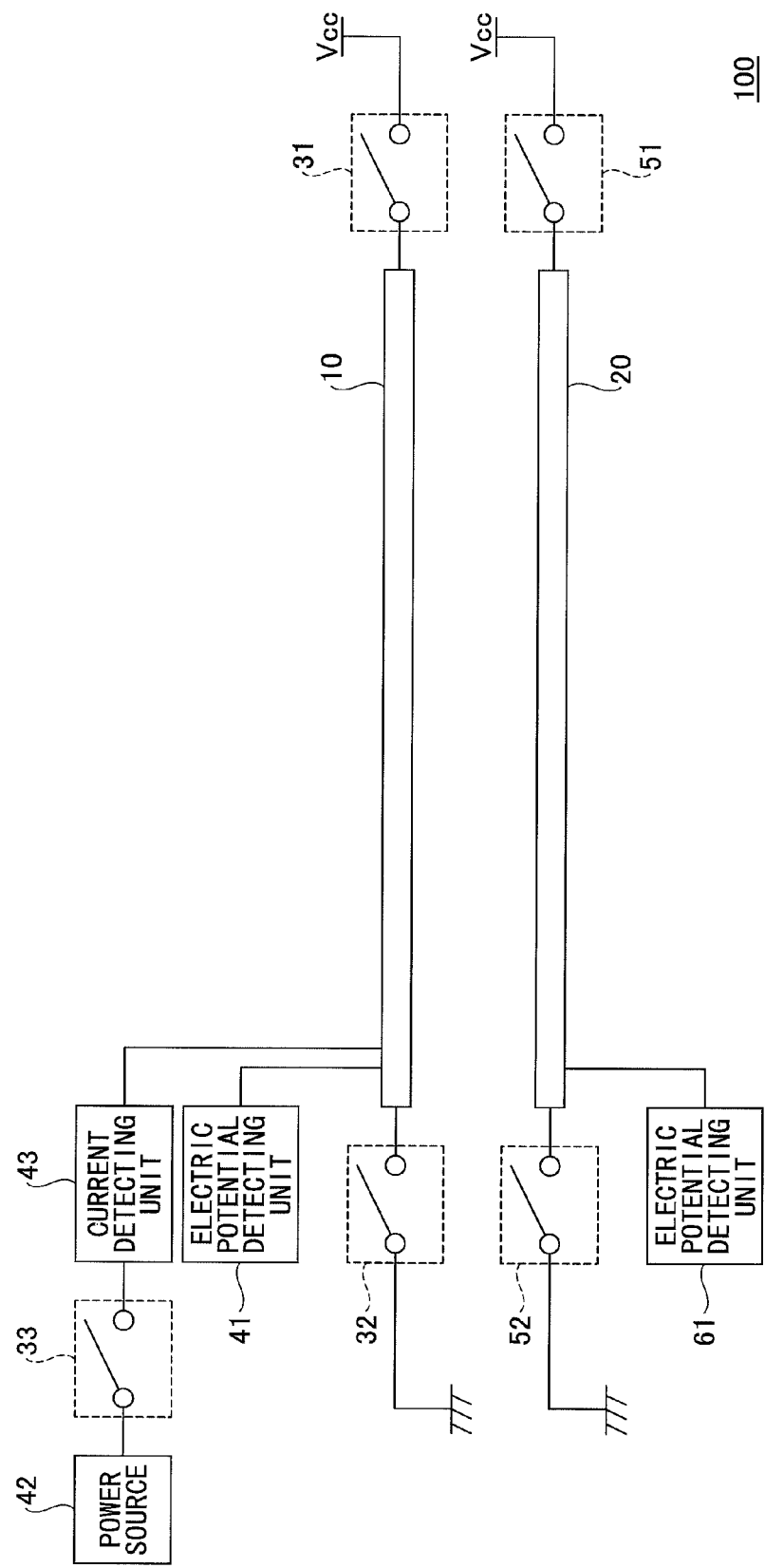
FIG. 2 is an explanatory view showing an example of a structure of a touch panel of the embodiment.

FIG. 2 is an explanatory view showing an example of a structure of a touch panel 100 of the embodiment.

The touch panel 100 of the embodiment is a four-wire type. The touch panel 100 includes an upper transparent conductive layer 10 formed on an upper conductive substrate (not shown in FIG. 2), and a lower transparent conductive layer 20 formed on a lower conductive substrate (not shown in FIG. 2). The upper conductive substrate is composed of a transparent film or the like. The lower conductive substrate is composed of a glass or the like. The upper transparent conductive layer 10 and the lower transparent conductive layer 20 are positioned to face each other with a predetermined interval.

The touch panel 100 further includes switches 31 and 32 respectively connected to opposing edges in an X-axis direction of the upper transparent conductive layer 10. The switch 31 is connected to a power source (not shown in the drawings) to be provided with a power source potential (Vcc). The switch 32 is connected to a ground potential. By connecting the upper transparent conductive layer 10 to the power source potential Vcc and to the ground potential respectively via the switches 31 and 32, a potential gradient in the X-axis direction is generated on the upper transparent conductive layer 10.

The touch panel 100 further includes switches 51 and 52 respectively connected to opposing edges in a Y-axis direction of the lower transparent conductive layer 20. The switch 51 is connected to a power source (not shown in the drawings) to be provided with a power source potential (Vcc). The switch 52 is connected to a ground potential. By connecting the lower transparent conductive layer 20 to the power source potential Vcc and to the ground potential respectively via the switches 51 and 52, a potential gradient in the Y-axis direction is generated on the lower transparent conductive layer 20.

The touch panel 100 further includes an electric potential detecting unit 41 (a first electric potential detecting unit) and an electric potential detecting unit 61 (a second electric potential detecting unit) respectively connected to the upper transparent conductive layer 10 and the lower transparent conductive layer 20.

The electric potential detecting unit 41 detects an electric potential of the upper transparent conductive layer 10 when the upper transparent conductive layer 10 contacts the lower transparent conductive layer 20 under a condition where a potential gradient in the Y-axis direction is generated on the lower transparent conductive layer 20. In this embodiment, because of the electric potential detected by the electric potential detecting unit 41, a coordinate position of a contacted point in the Y-axis direction can be obtained.

The electric potential detecting unit 61 detects an electric potential of the lower transparent conductive layer 20 when the lower transparent conductive layer 20 contacts the upper transparent conductive layer 10 under a condition where a potential gradient in the X-axis direction is generated on the upper transparent conductive layer 10. In this embodiment, because of the electric potential detected by the electric potential detecting unit 61, a coordinate position of a contacted point in the X-axis direction can be obtained.

The touch panel 100 further includes a power source 42 for applying a predetermined voltage to the upper transparent conductive layer 10, a switch 33 and a current detecting unit 43 connected to the upper transparent conductive layer 10.

Figure 6:
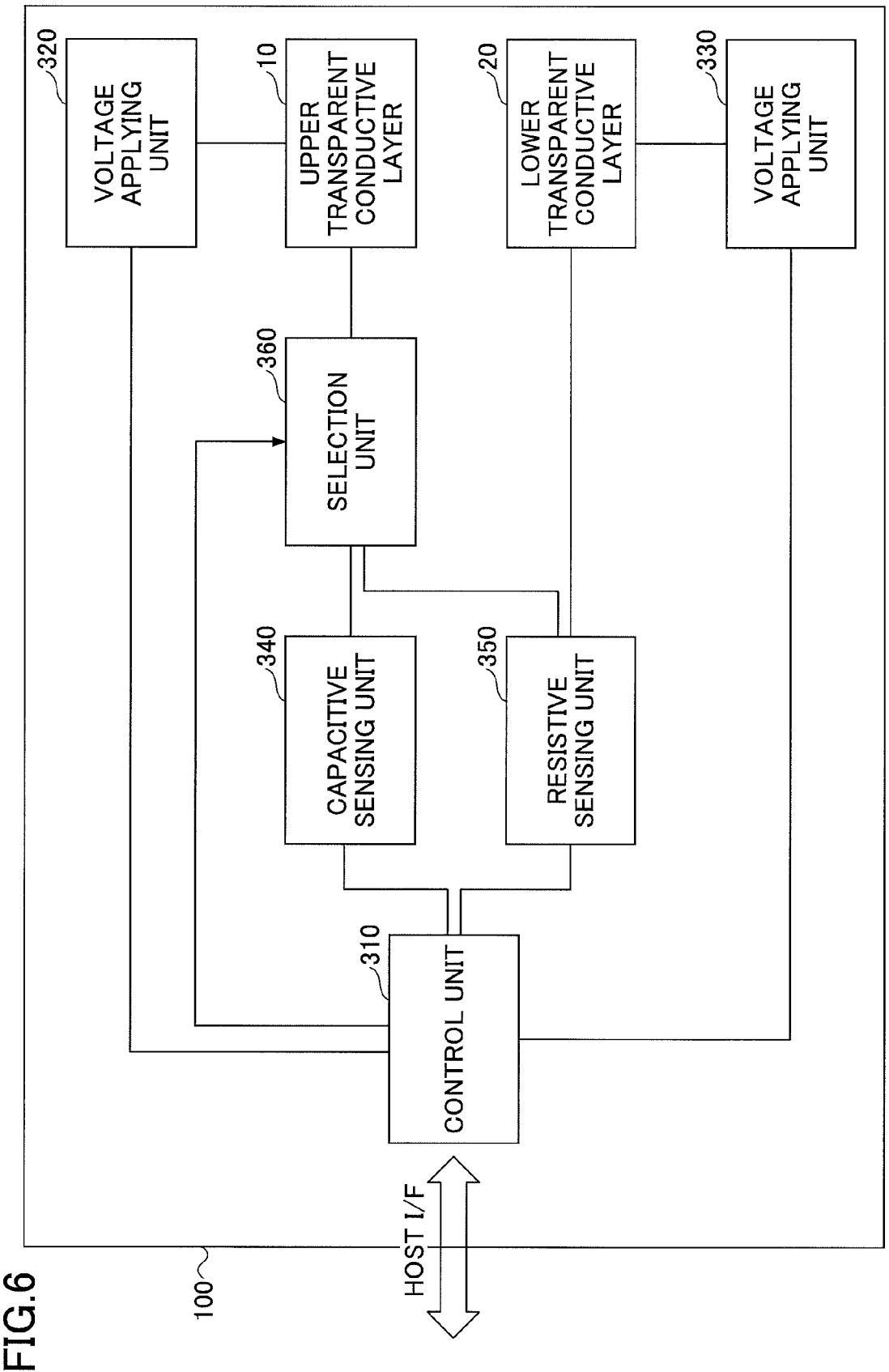
FIG. 6 is a block diagram showing an example of a structure of the touch panel according to the second embodiment.

FIG. 6 is a block diagram showing an example of a structure of the touch panel 100 according to the first embodiment. Voltage applying units 320 and 330 are shown in FIG. 6 in addition to the components shown in FIG. 1.

The capacitive sensing unit 340 includes the power source 42, the switch 33 and the current detecting units 43, for example. Although not shown in the drawings, a plurality of the current detecting units 43 are systematically provided at plural positions of the upper transparent conductive layer 10 (four corners of the upper transparent conductive layer 10, for example) and a touched position where a finger or the like touches the panel surface of the touch panel 100 can be detected by the capacitive sensing unit 340 based on the current values detected by the plural current detecting units 43.

The resistive sensing unit 350 includes the electric potential detecting units 41 and 61, for example.

The voltage applying unit 320 generates an electric potential distribution on the upper transparent conductive layer 10 when detecting a coordinate position by the resistive sensing unit 350. The voltage applying unit 320 includes the power source (not shown in the drawings), switches 31 and 32 and the like, for example.

The voltage applying unit 330 generates an electric potential distribution on the lower transparent conductive layer 20 when detecting a coordinate position by the resistive sensing unit 350. The voltage applying unit 330 includes the power source (not shown in the drawings), the switches 51 and 52 and the like, for example. Although the voltage applying unit 320 and the voltage applying unit 330 are shown separately in FIG. 6, the voltage applying unit 320 and the voltage applying unit 330 may be included in the resistive sensing unit 350.

The control unit 310 controls applying a voltage to the upper transparent conductive layer 10 by the voltage applying unit 320 and applying a voltage to the lower transparent conductive layer 20 by the voltage applying unit 330.

Operations of detecting a coordinate position in the touch panel 100 of the embodiment will be explained with reference to FIG. 3 to FIG. 5 in addition to FIG. 6.

First, a case where the resistive sensing unit 350 detects a coordinate position is explained.

Figure 3:
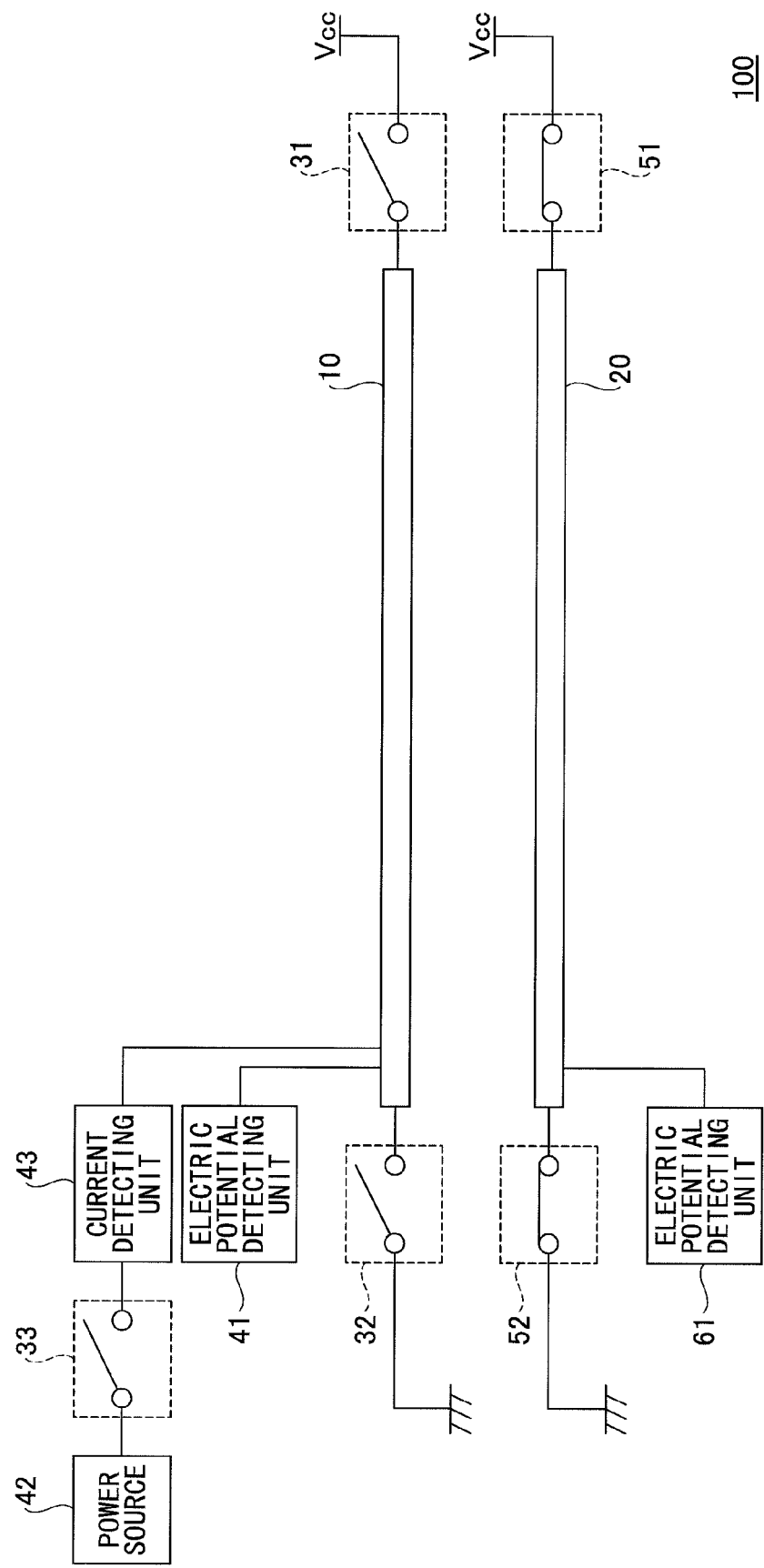
FIG. 3 is an explanatory view showing an example of a structure of the touch panel of the first embodiment.

For this case, as shown in FIG. 3, the switches 51 and 52 connected to the lower transparent conductive layer 20 are closed so that a potential gradient is generated on the lower transparent conductive layer 20 in the Y-axis direction. At this time, the switches 31 and 32 connected to the upper transparent conductive layer 10 are open. Further, the switch 33 is also open.

When a finger or the like touches a panel surface of the touch panel 100 to push the upper transparent conductive layer 10 at a certain position under this condition, the upper transparent conductive layer 10 and the lower transparent conductive layer 20 come into contact at the pushed position. Therefore, the upper transparent conductive layer 10 becomes a potential equal to the electric potential of the pushed position of the lower transparent conductive layer 20. The electric potential detecting unit 41 connected to the upper transparent conductive layer 10 detects the potential of the upper transparent conductive layer 10. The control unit 310 controls the resistive sensing unit 350 as it detects the coordinate position (Y coordinate position) in the Y-axis direction of the pushed position based on the electric potential detected by the electric potential detecting unit 41.

Figure 4:
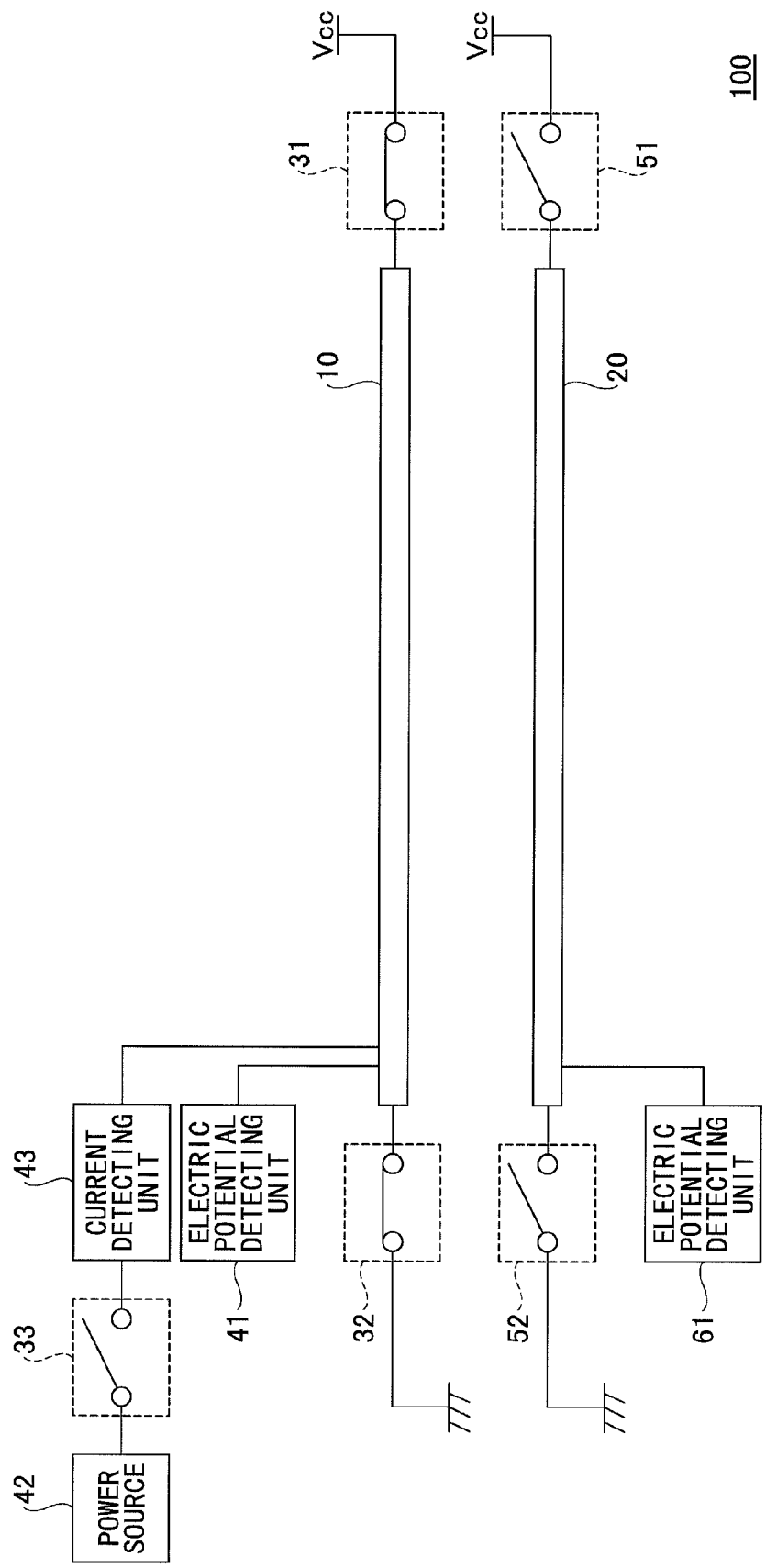
FIG. 4 is an explanatory view showing an example of a structure of the touch panel of the first embodiment.

Then, as shown in FIG. 4, the switches 31 and 32 connected to the upper transparent conductive layer 10 are closed so that a potential gradient is generated on the upper transparent conductive layer 10 in the X-axis direction. At this time, the switches 51 and 52 connected to the lower transparent conductive layer 20 are opened. Further, the switch 33 is also open.

When a finger or the like touches the panel surface of the touch panel 100 to push the upper transparent conductive layer 10 at a certain position under this condition, the upper transparent conductive layer 10 and the lower transparent conductive layer 20 come into contact at the pushed position. Therefore, the lower transparent conductive layer 20 has a potential equal to the electric potential of the pushed position of the upper transparent conductive layer 10. The electric potential detecting unit 61 connected to the lower transparent conductive layer 20 detects the potential of the lower transparent conductive layer 20. The control unit 310 controls the resistive sensing unit 350 as it detects the coordinate position (X coordinate position) in the X-axis direction of the pushed position based on the electric potential detected by the electric potential detecting unit 61.

With the above-described operations with reference to FIG. 3 and FIG. 4, the resistive sensing unit 350 detects the coordinates (X, Y) of the touched position.

Next, a case where the capacitive sensing unit 340 detects the coordinate position is explained.

Figure 5:
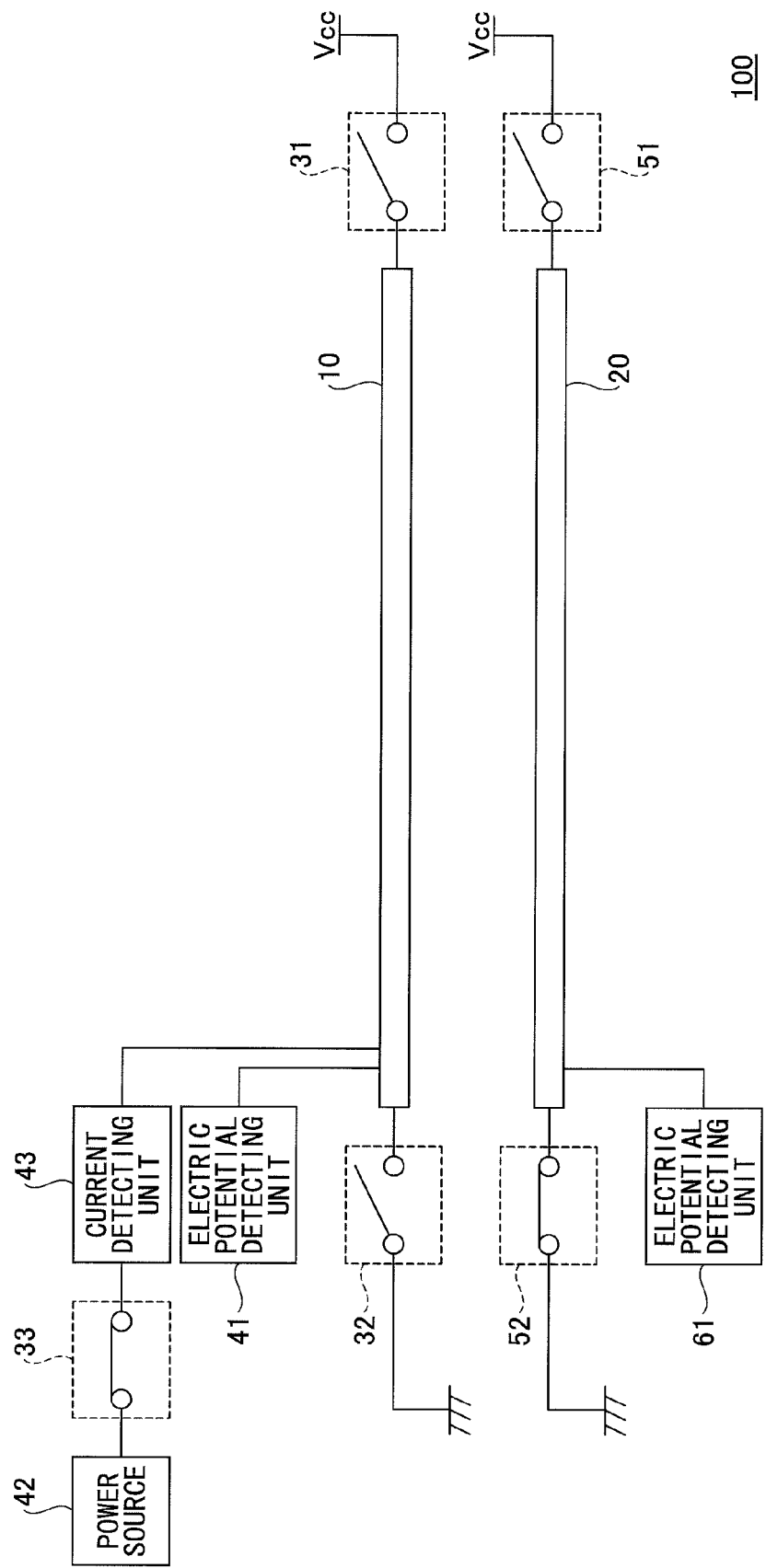
FIG. 5 is an explanatory view showing an example of a structure of the touch panel of the first embodiment.

For this case, as shown in FIG. 5, the switch 33 connected to the power source 42 and the upper transparent conductive layer 10 via the current detecting unit 43 is closed while the switches 31 and 32 connected to the upper transparent conductive layer 10 are opened. With this operation, the potential of the upper transparent conductive layer 10 becomes equal to the potential supplied by the power source 42.

When a finger or the like touches the panel surface of the touch panel 100 under this condition, the capacitance varies to vary a current that flows from the power source 42 to the upper transparent conductive layer 10. The current detecting units 43 detect the variation of the current. The control unit 310 controls the capacitive sensing unit 340 as it detects the coordinate position based on the current values detected by the current detecting units 43.

Further, when the capacitive sensing unit 340 detects the coordinate position, the switch 52 connected to the ground potential and the lower transparent conductive layer 20 may be closed while the switch 51 connected to the power source potential and the lower transparent conductive layer 20 may be opened so that the entirety of the lower transparent conductive layer 20 can be kept at the ground potential. By keeping the potential of the lower transparent conductive layer 20 at ground potential, influence of noise or the like from the back surface of the lower transparent conductive layer 20 can be prevented.

In this embodiment, the processes as explained with reference to FIG. 3 to FIG. 5 may be repeated to detect a coordinate position of a touched point.

Figure 7:
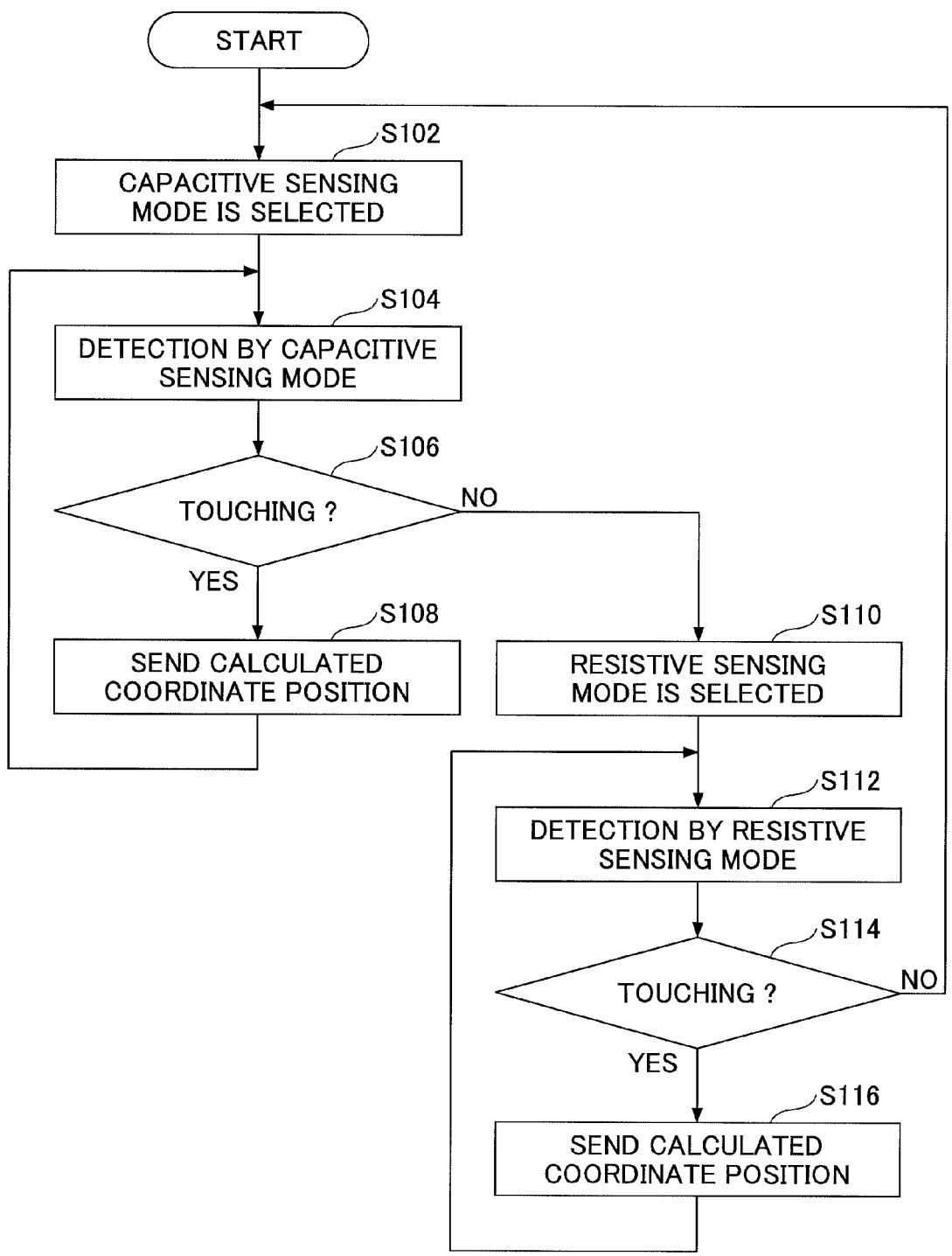
FIG. 7 is a flowchart showing an example of a method of detecting a coordinate position by the touch panel of the embodiment.

FIG. 7 is a flowchart showing an example of a method of detecting a coordinate position by the touch panel 100 of the embodiment.

First, a capacitive sensing mode is selected (step S102). Concretely, as shown in FIG. 5, the switches 31 and 32 connected to the upper transparent conductive layer 10 are opened and the switch 33 connected to the upper transparent conductive layer 10 is closed to have the potential of the upper transparent conductive layer 10 at an electric potential provided by the power source 42. At this time, the switch 51 connected to the lower transparent conductive layer 20 may be opened and the switch 52 connected to the lower transparent conductive layer 20 may be closed.

Then, a coordinate position of a touched point is detected by the capacitive sensing mode (step S104). Concretely, as shown in FIG. 6, the selection unit 360 selects the capacitive sensing units 340 to detect the status of an electric potential of the upper transparent conductive layer 10 so that a coordinate position by the capacitive sensing mode can be detected through the upper transparent conductive layer 10.

Then, the control unit 310 controls the determination of whether touching is detected by the capacitive sensing mode (step S106). Concretely, the control unit 310 controls the determination of whether touching is detected based on current values detected by the current detecting units 43. When it is determined that touching by the capacitive sensing mode is detected (Yes in step S106), the process proceeds to step S108. It means that the capacitive sensing mode is continuously selected while touching is detected.

When, on the other hand, it is determined that touching by the capacitive sensing mode is not detected in step S106 (No in step S106), the process proceeds to step S110.

In step S108, the control unit 310 calculates a coordinate position of the touched point by the capacitive sensing mode based on the current values detected by the current detecting units 43 and sends the calculated coordinate position to the host computer or the like.

In step S110, the resistive sensing mode is selected. In step S110, the conditions as shown in FIG. 3 and in FIG. 4 are performed alternately.

Concretely, as for one condition, as shown in FIG. 3, the switches 51 and 52 connected to the lower transparent conductive layer 20 are closed to generate a potential gradient on the lower transparent conductive layer 20 in the Y-axis direction. At this time, the switches 31, 32 and 33 connected to the upper transparent conductive layer 10 are opened.

Then, a coordinate position of a touched point is detected by the resistive sensing mode (step S112). Concretely, as shown in FIG. 6, the selection unit 360 selects the resistive sensing unit 350 to detect the status of an electric potential of the upper transparent conductive layer 10 so that a coordinate position by the resistive sensing mode can be detected through the upper transparent conductive layer 10.

As for another condition in step S110, as shown in FIG. 4, the switches 31 and 32 connected to the upper transparent conductive layer 10 are closed to generate a potential gradient on the upper transparent conductive layer 10 in the X-axis direction. At this time, the switches 51 and 52 connected to lower transparent conductive layer 20 and the switch 33 connected to the upper transparent conductive layer 10 are opened.

Then, the control unit 310 controls the determination of whether touching is detected by the resistive sensing mode (step S114). Concretely, the control unit 310 controls the determination of whether touching is detected based on an electric potential which is detected by the electric potential detecting unit 41 or the electric potential detecting unit 61. When it is determined that touching by the resistive sensing mode is detected (Yes in step S114), the process proceeds to step S116. It means that the resistive sensing mode is continuously selected while touching is detected.

When, on the other hand, it is determined that touching by the resistive sensing mode is not detected in step S114 (No in step S114), the process proceeds to step S102.

In step S116, the control unit 310 calculates a coordinate position of the touched point by the resistive sensing mode based on the potential detected by the electric potential detecting unit 41 under the condition as shown in FIG. 3 or the potential detected by the electric potential detecting unit 61 under the condition as shown in FIG. 4 and sends the calculated coordinate position to the host computer or the like.

In this embodiment, detection by the capacitive sensing mode and detection by the resistive sensing mode are performed at different timing.

As described above, a coordinate position of a touched point can be detected by using the touch panel 100 of the first embodiment. In the method of detecting the coordinate position, the touch panel for which any device composed of any material can be used for touching, and the coordinate position can be detected easily just by touching, can be used with a low cost.

According to the touch panel 100 of the embodiment, when detecting a coordinate position of a touched point by the resistive sensing mode, the upper transparent conductive layer 10 and the lower transparent conductive layer 20 are used and when detecting a coordinate position of a touched point by the capacitive sensing mode, only the upper transparent conductive layer 10 is used. It means that according to the touch panel 100 of the embodiment, the upper transparent conductive layer 10 is commonly used for the resistive sensing mode and the capacitive sensing mode. Therefore, the touch panel 100 of the embodiment can be made thinner with a lower cost compared with a case where two kinds of touch panels are stacked. It means that a touch panel capable of detecting a coordinate position just by touching as well as by using any device of any material of a thinner and with a lower cost can be manufactured. Further, as a number of transparent conductive layers can be reduced compared with the case where two kinds of touch panels are stacked, visibility can be improved.

Next, alternative structures of the upper transparent conductive layer 10 will be explained. The upper transparent conductive layer 10 may be separated into plural meshed areas.

Figure 8:
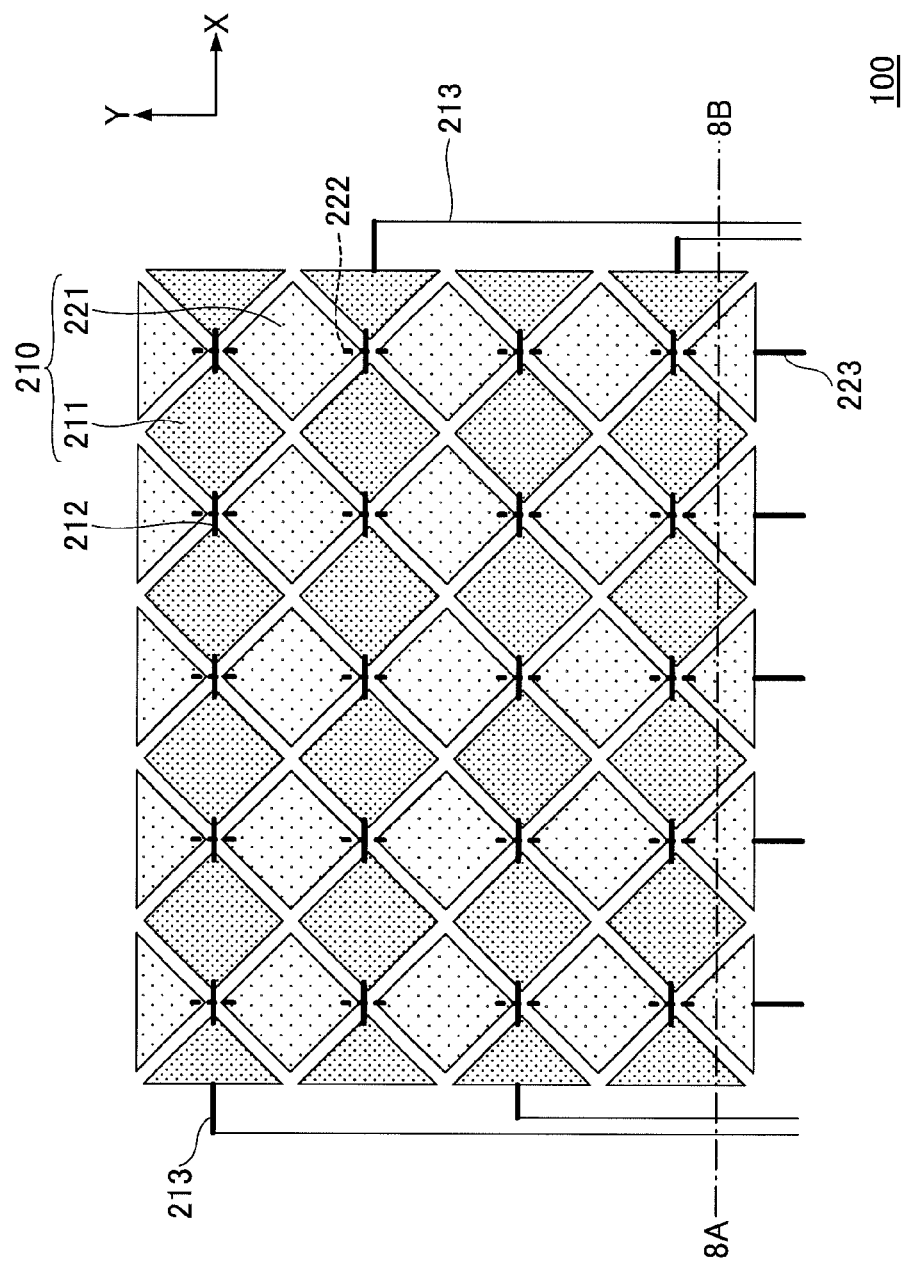
FIG. 8 is a plan view showing an example of the touch panel including an upper transparent conductive layer composed of plural areas.

FIG. 8 is a plan view showing an example of the touch panel 100 including an upper transparent conductive layer 210 composed of plural areas including a group of plural areas 211 aligned at least in the X-axis direction and a group of plural areas 221 aligned at least in the Y-axis direction.

Figure 9:
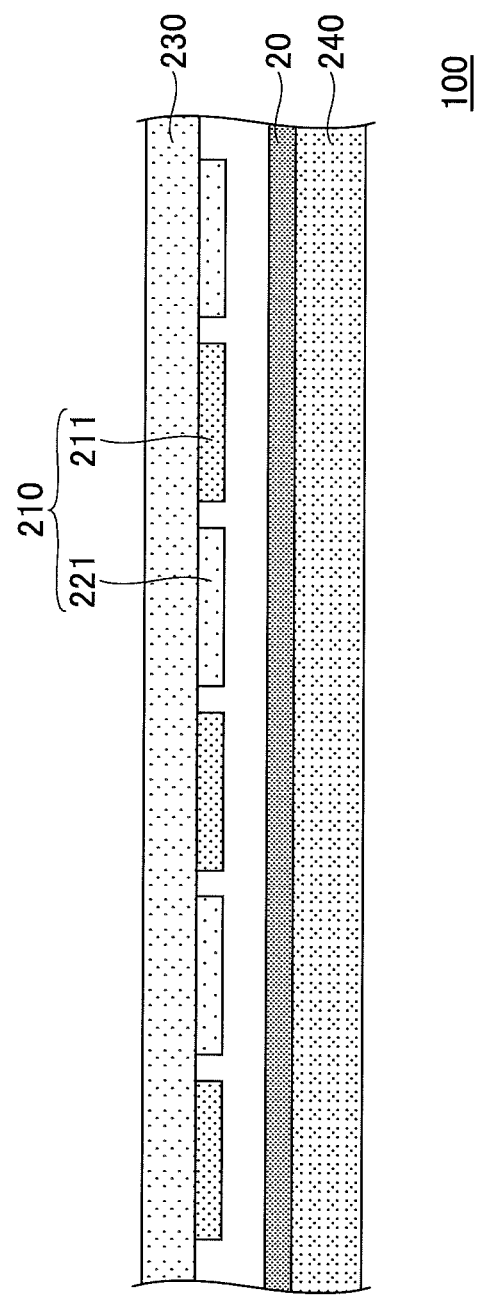
FIG. 9 is a cross-sectional view taken along a 8A-8B line in FIG. 8.

In this embodiment, the plural areas 211 are also aligned in the Y-axis direction and the plural areas 221 are also aligned in the X-axis direction. FIG. 9 is a cross-sectional view taken along a 8A-8B line in FIG. 8.

As shown in FIG. 9, the touch panel 100 includes a transparent substrate 240 composed of a glass or the like which functions as the lower conductive substrate and a transparent substrate 230 which functions as the upper conductive substrate. The upper transparent conductive layer 210 is formed on the transparent substrate 230. The lower transparent conductive layer 20 is formed on the transparent substrate 240.

Referring to FIG. 8, the upper transparent conductive layer 210 is formed by dividing a plane with lines extending in 45° with respect to the X-axis direction and the Y-axis direction.

The upper transparent conductive layer 210 is composed of lines of areas 211 aligned in the Y-axis direction and the lines of areas 221 aligned in the X-axis direction. Here, the areas 211 and the areas 221 are alternately positioned in the directions extending in 45° with respect to the X-axis direction and the Y-axis direction.

In each of the lines of areas 221 in the X-axis direction, areas 221 are electrically connected via connecting portions 222. The areas 221 are connected to extracting lines 223 at the edge in the Y-axis direction.

As for the areas 211, in each of the lines of areas 211 in the Y-axis direction, the areas 211 are electrically connected via connecting portions 212. The areas 211 are connected to extracting lines 213 at the edges in the X-axis direction.

Figure 10:
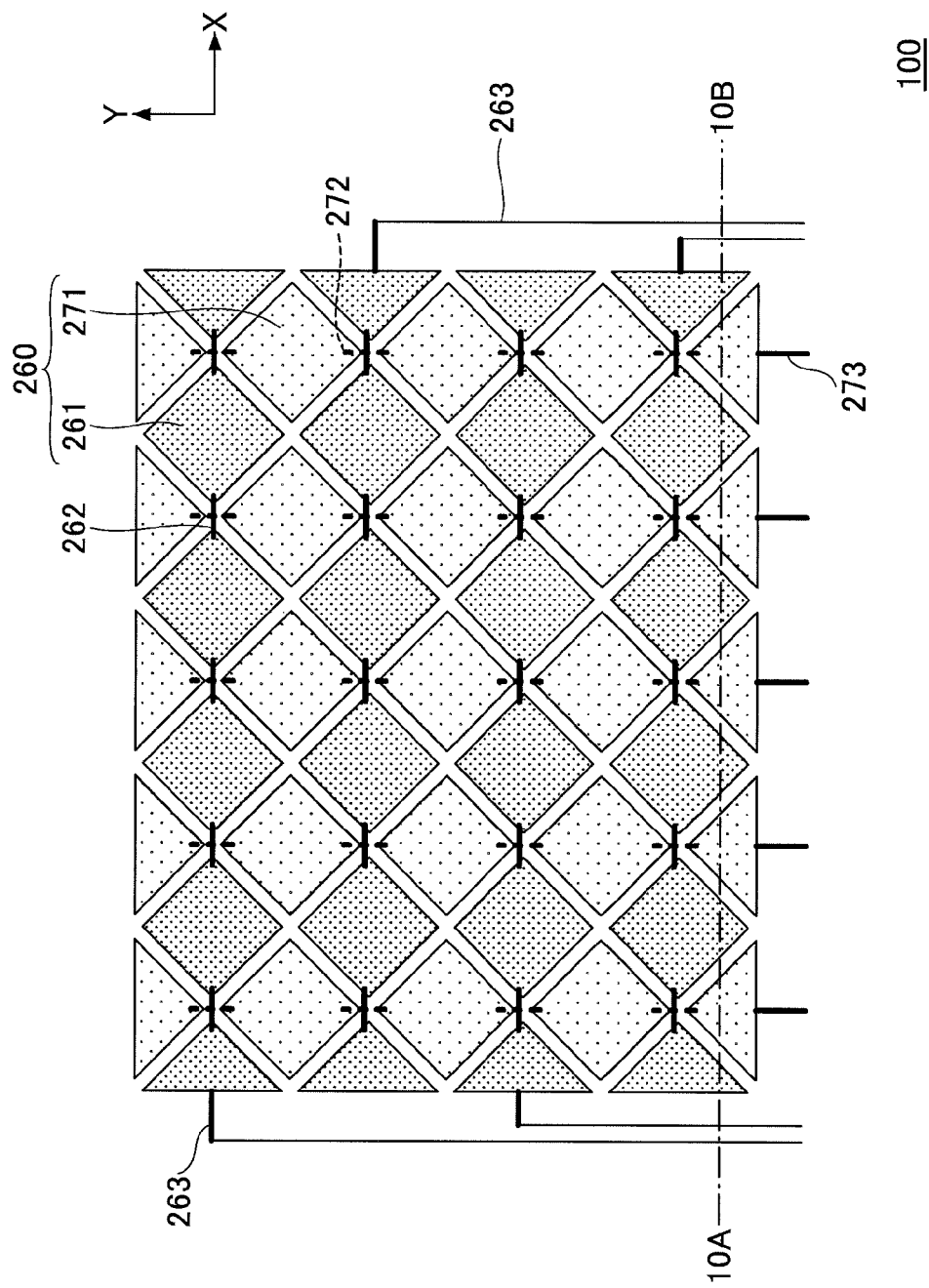
FIG. 10 is a plan view showing another example of the touch panel including an upper transparent conductive layer composed of plural areas.
Figure 11:
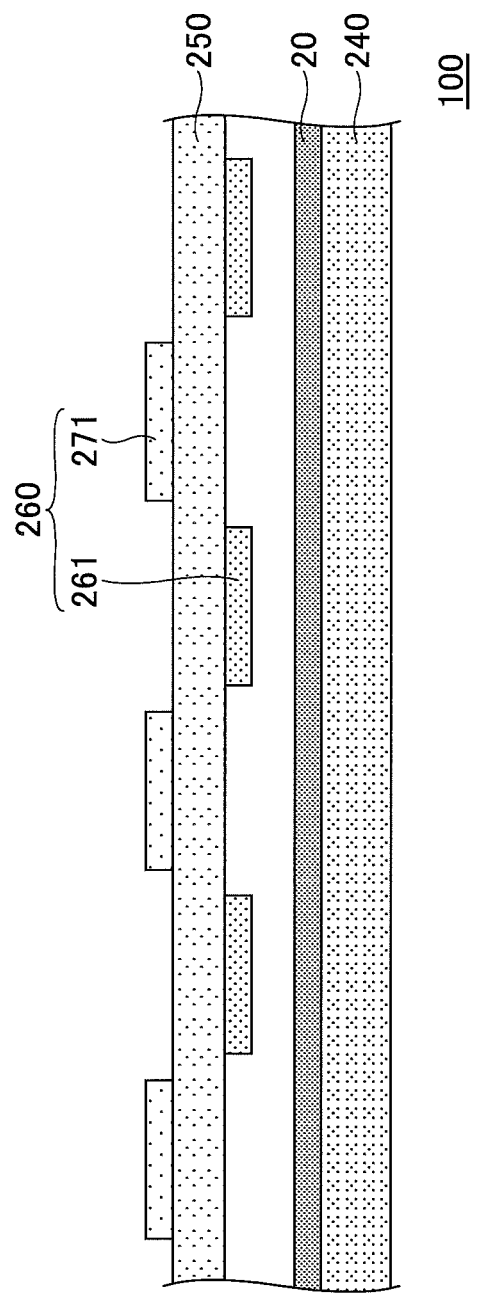
FIG. 11 is a cross-sectional view taken along a 10A-10B line in FIG. 10.

FIG. 10 is a plan view showing another example of the touch panel 100 including an upper transparent conductive layer 260 composed of plural areas 261 and 271. FIG. 11 is a cross-sectional view taken along a 10A-10B line in FIG. 10.

In this example, a part of the upper transparent conductive layer 260 is formed on one surface of a transparent substrate 250 which functions as the upper conductive substrate and the rest of the upper transparent conductive layer 260 is formed on the other surface of the transparent substrate 250.

In this example as well, the upper transparent conductive layer 260 has a same structure as that of the upper transparent conductive layer 210 shown in FIG. 8 in a plan view. The upper transparent conductive layer 260 is composed of areas 261 and areas 271.

Concretely, in this example, the areas 261 are formed on the surface of the transparent substrate 250 facing the lower transparent conductive layer 20. The areas 261 are electrically connected in the X-axis direction via connecting portions 262 to be connected to an extracting line 263.

The areas 271 are formed on the other surface of transparent substrate 250. The areas 271 are electrically connected in the Y-axis direction via connecting portions 272 to be connected to an extracting line 273.

Even for such a structure where part (areas 271) of the upper transparent conductive layer 260 is formed on the surface of the transparent substrate 250 on the side not facing the lower transparent conductive layer 20, the rest of the part (areas 261) of the upper transparent conductive layer 260 on the side facing the lower transparent conductive layer 20 functions to contact with the lower transparent conductive layer 20 when the resistive sensing mode is selected.

As for the upper transparent conductive layer, the upper transparent conductive layer composed of plural meshed areas as the upper transparent conductive layer 210 or 260 may be used instead of the upper transparent conductive layer 10.

As for the touch panel 100 as shown in FIG. 8 and FIG. 9 or in FIG. 10 and FIG. 11, a coordinate position can be detected in accordance with the method of detecting the coordinate position of the embodiment.

(Second Embodiment)

A touch panel of a second embodiment will be explained.

Figure 12:
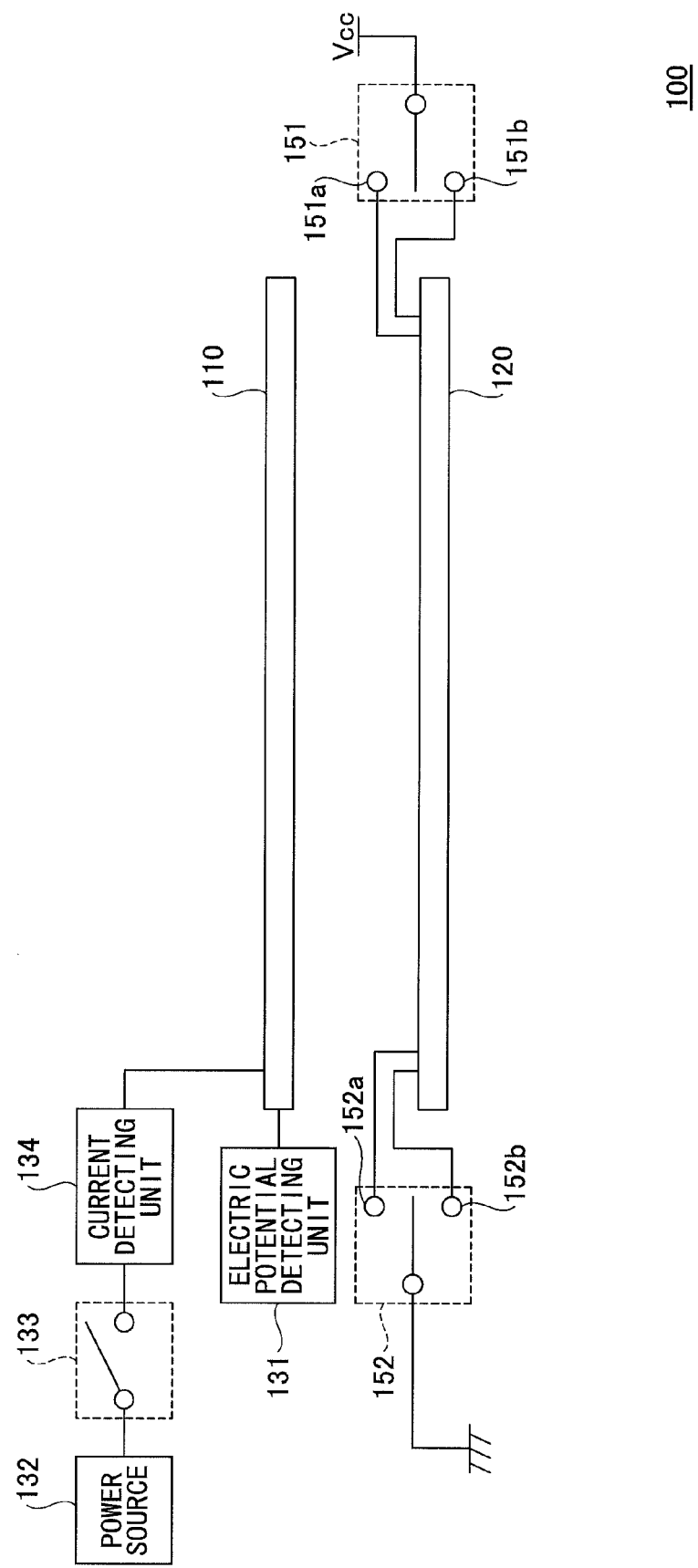
FIG. 12 is an explanatory view showing an example of a structure of a touch panel of a second embodiment.

FIG. 12 is an explanatory view showing an example of a structure of a touch panel 100 of the embodiment.

The touch panel 100 of the embodiment is a five-wire type.

The touch panel 100 includes an upper transparent conductive layer 110 formed on an upper conductive substrate (not shown in FIG. 12), and a lower transparent conductive layer 120 formed on a lower conductive substrate (not shown in FIG. 12). The upper transparent conductive layer 110 and the lower transparent conductive layer 120 are positioned to face each other with a predetermined interval.

The touch panel 100 further includes switches 151 and 152 respectively connected to a power source (not shown in the drawings) to be provided with a power source potential (Vcc) and a ground potential.

The switch 151 includes a first terminal 151a and a second terminal 151b respectively connected to the lower transparent conductive layer 120. The switch 152 includes a third terminal 152a and a fourth terminal 152b respectively connected to the lower transparent conductive layer 120.

Here, the first terminal 151a and the third terminal 152a are respectively connected to opposing edges in the Y-axis direction of the lower transparent conductive layer 120. By connecting the switch 151 to the first terminal 151a and connecting the switch 152 to the third terminal 152a, a potential gradient in the Y-axis direction is generated on the lower transparent conductive layer 120.

Similarly, the second terminal 151b and the fourth terminal 152b are respectively connected to opposing edges in the X-axis direction of the lower transparent conductive layer 120. By connecting the switch 151 to the second terminal 151b and connecting the switch 152 to the fourth terminal 152b, a potential gradient in the X-axis direction is generated on the lower transparent conductive layer 120.

The touch panel 100 further includes an electric potential detecting unit 131 connected to the upper transparent conductive layer 10.

The electric potential detecting unit 131 detects an electric potential of the upper transparent conductive layer 110 when the upper transparent conductive layer 110 contacts the lower transparent conductive layer 120. In this embodiment, because of the electric potential detected by the electric potential detecting unit 131, a coordinate position of a contacted point in the X-axis direction and the Y-axis direction can be obtained.

The touch panel 100 further includes a power source 132 for applying a predetermined voltage to the upper transparent conductive layer 110, a switch 133 and a current detecting unit 134 connected to the upper transparent conductive layer 110.

Figure 16:
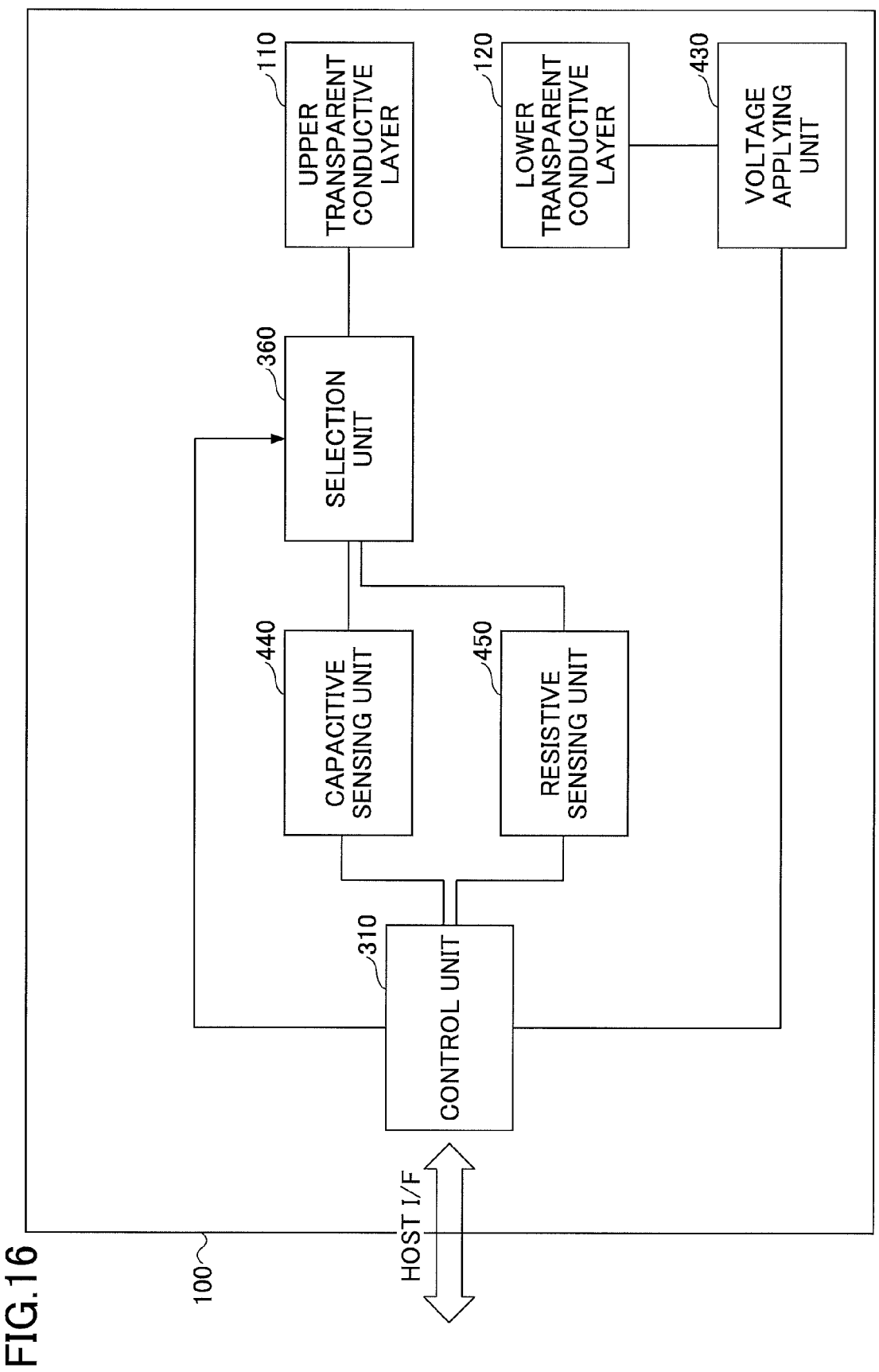
FIG. 16 is a block diagram showing an example of a structure of the touch panel according to the first embodiment.

FIG. 16 is a block diagram showing an example of a structure of the touch panel 100 according to the second embodiment. A Voltage applying unit 430 is shown in FIG. 16 in addition to the components shown in FIG. 1.

Here, the upper transparent conductive layer 110, the lower transparent conductive layer 120, the capacitive sensing unit 440, and the resistive sensing unit 450 respectively correspond to upper transparent conductive layer 10, the lower transparent conductive layer 20, the capacitive sensing unit 340, and the resistive sensing unit 350 shown in FIG. 1.

The capacitive sensing unit 440 includes the power source 132, the switch 133 and the current detecting unit 134, for example. Although not shown in the drawings, a plurality of the current detecting units 134 are systematically provided at plural different positions of the upper transparent conductive layer 110 (four corners of the upper transparent conductive layer 110, for example) and a touched position where a finger or the like touches the panel surface of the touch panel 100 can be detected by the capacitive sensing unit 440 based on the current values detected by the plural current detecting units 134.

The resistive sensing unit 450 includes the electric potential detecting unit 131, for example.

The voltage applying unit 430 generates an electric potential distribution in the Y-axis direction and in the X-axis direction on the lower transparent conductive layer 120 when detecting a coordinate position by the resistive sensing unit 450. The voltage applying unit 430 includes the power source (not shown in the drawings), switches 151 and 152 and the like. Although the voltage applying unit 430 is shown separately in FIG. 16, the voltage applying unit 430 may be included in the resistive sensing unit 450.

The control unit 310 controls applying a voltage to the lower transparent conductive layer 120 by the voltage applying unit 430 or the like.

Operations of detecting a coordinate position in the touch panel 100 of the embodiment will be explained with reference to FIG. 13 to FIG. 15 in addition to FIG. 16.

First, a case where the resistive sensing unit 450 detects a coordinate position is explained.

Figure 13:
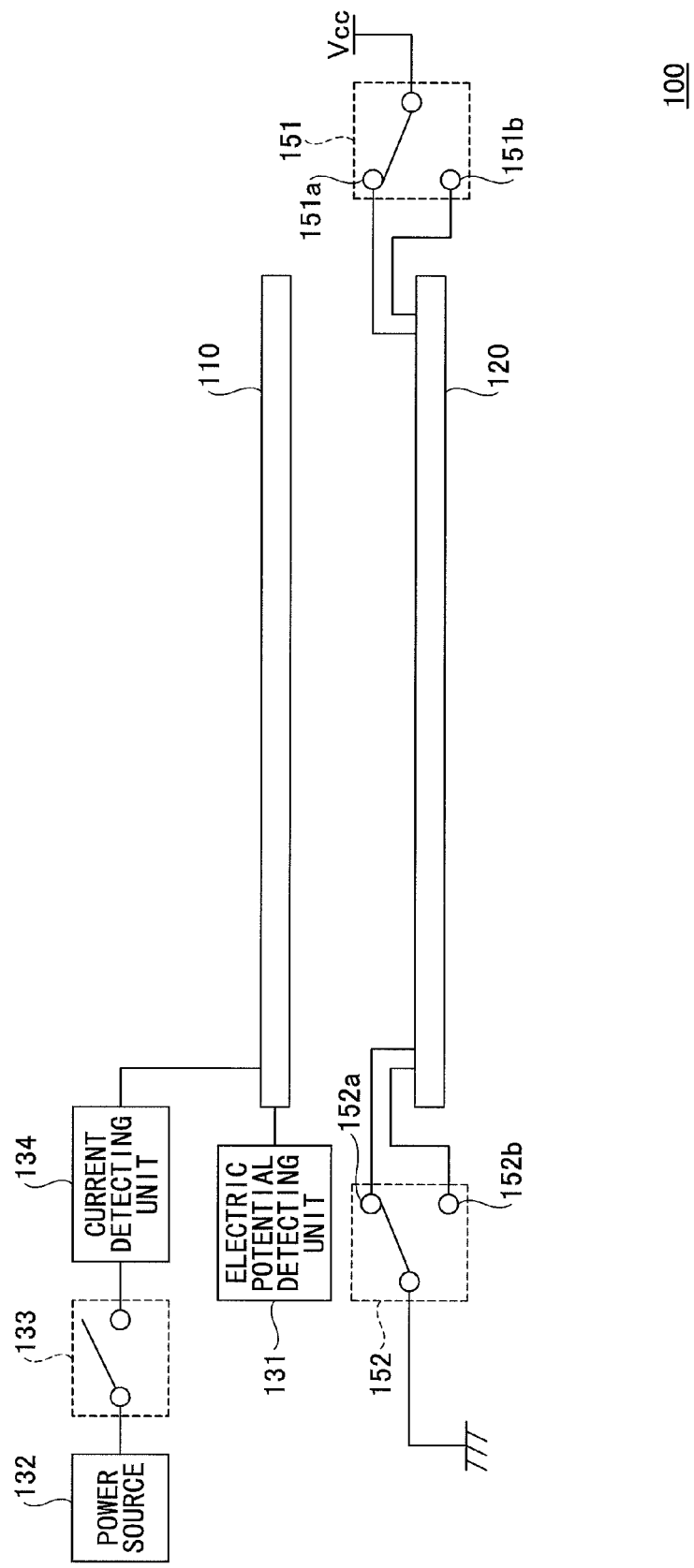
FIG. 13 is an explanatory view showing an example of a structure of the touch panel of the second embodiment.

For this case, as shown in FIG. 13, the switches 151 and 152 are respectively connected to the first terminal 151a and the third terminal 152a so that a potential gradient is generated on the lower transparent conductive layer 120 in the Y-axis direction. At this time, the switch 133 is open.

When a finger or the like touches the panel surface of the touch panel 100 to push the upper transparent conductive layer 110 at a certain position under this condition, the upper transparent conductive layer 110 and the lower transparent conductive layer 120 come into contact at the pushed position. Therefore, the upper transparent conductive layer 110 has a potential equal to the electric potential of the pushed position of the lower transparent conductive layer 120. The electric potential detecting unit 131 connected to the upper transparent conductive layer 110 detects the potential of the upper transparent conductive layer 110. The control unit 310 controls the resistive sensing unit 450 as it detects the coordinate position (Y coordinate position) in the Y-axis direction of the pushed position based on the electric potential detected by the electric potential detecting unit 131.

Figure 14:
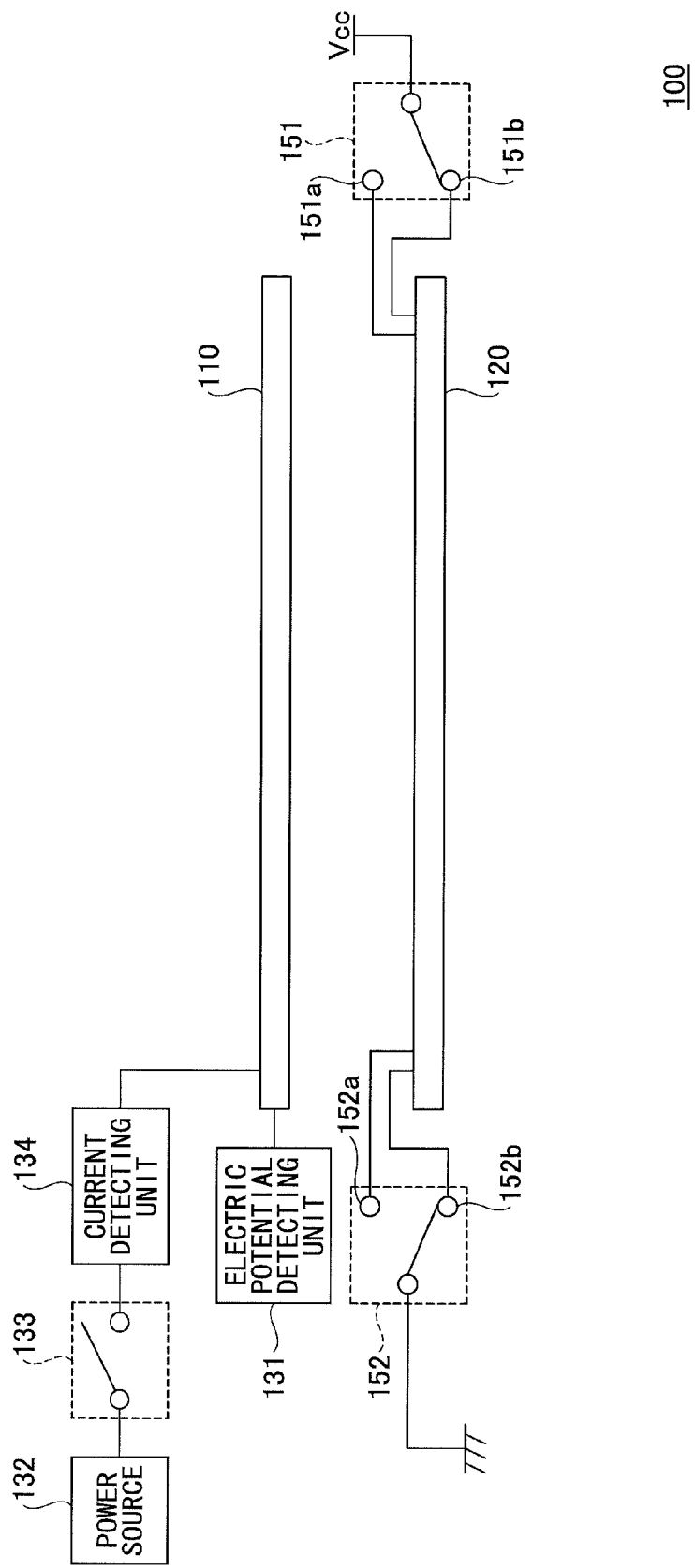
FIG. 14 is an explanatory view showing an example of a structure of the touch panel of the second embodiment.

Then, as shown in FIG. 14, the switches 151 and 152 are respectively connected to the second terminal 151b and the fourth terminal 152b so that a potential gradient is generated on the on the lower transparent conductive layer 120 in the X-axis direction.

When a finger or the like touches the panel surface of the touch panel 100 to push the upper transparent conductive layer 10 at a certain position under this condition, the upper transparent conductive layer 110 and the lower transparent conductive layer 120 contact at the pushed position. Therefore, the upper transparent conductive layer 110 becomes a potential equal to the electric potential of the pushed position of the lower transparent conductive layer 120. The electric potential detecting unit 131 connected to the upper transparent conductive layer 110 detects the potential of the upper transparent conductive layer 110. The control unit 310 controls the resistive sensing unit 450 as it detects the coordinate position (X coordinate position) in the X-axis direction of the pushed position based on the electric potential detected by the electric potential detecting unit 131.

With the above-described operations with reference to FIG. 13 and FIG. 14, the resistive sensing unit 450 detects the coordinates (X, Y) of the touched position.

Next, a case where the capacitive sensing unit 440 detects the coordinate position is explained.

Figure 15:
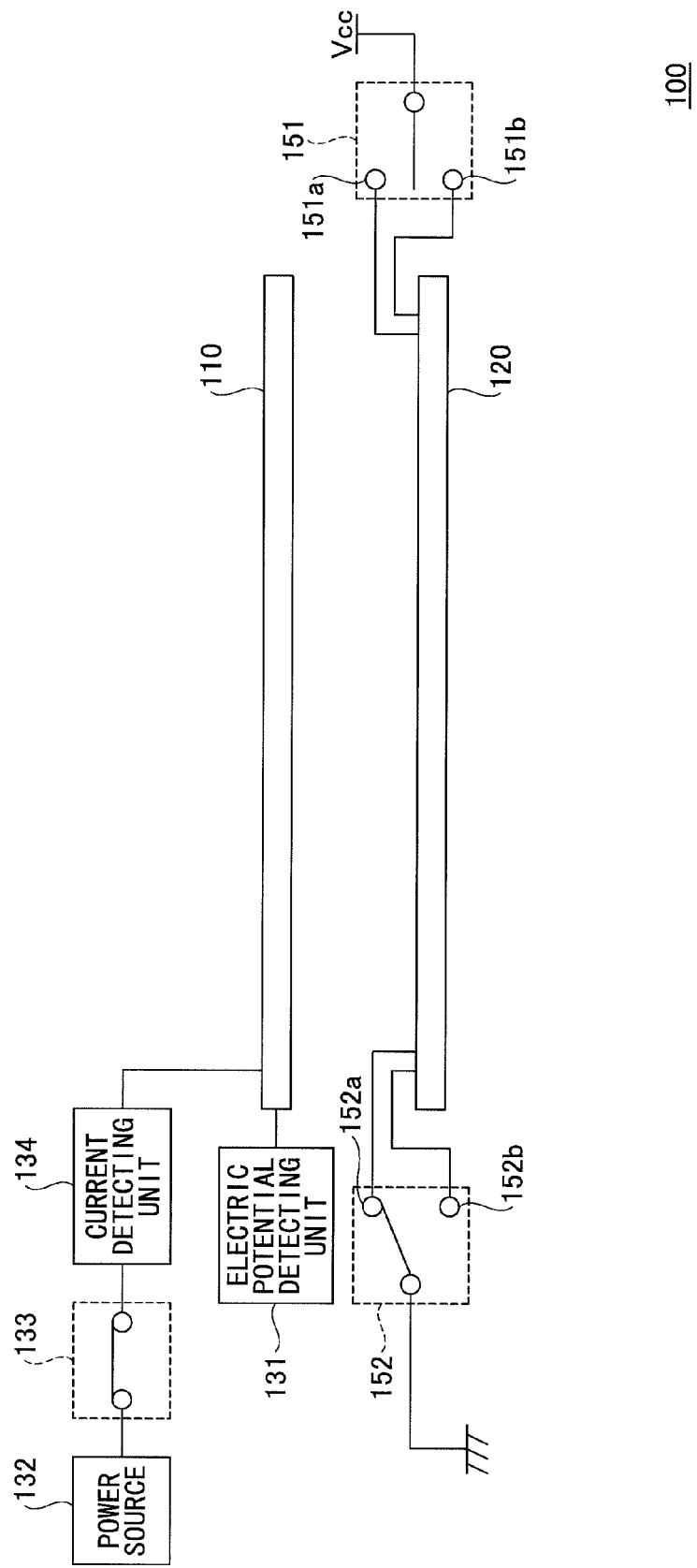
FIG. 15 is an explanatory view showing an example of a structure of the touch panel of the second embodiment.

For this case, as shown in FIG. 15, the switch 133 connected to the power source 132 and the upper transparent conductive layer 110 via the current detecting unit 134 is closed to have a potential of the upper transparent conductive layer 110 become equal to the potential supplied by the power source 132.

When a finger or the like touches the panel surface of the touch panel 100 under this condition, the capacitance varies to vary a current that flows from the power source 132 to the upper transparent conductive layer 110. The current detecting unit 134 detects the variation of the current.

As for the condition shown in FIG. 15, the switch 151 may be open (neither of the first terminal 151a or the second terminal 151b are connected to the power source potential) and the switch 152 may be closed (either of the third terminal 152a or the fourth terminal 152b is connected to the ground potential). By closing the switch 152, the entirety of the lower transparent conductive layer 120 can be kept at the ground potential. By keeping the potential of the lower transparent conductive layer 120 at the ground potential, influence of noises or the like from the back surface of the lower transparent conductive layer 120 can be prevented.

In this embodiment, the processes as explained with reference to FIG. 13 to FIG. 15 may be repeated to detect a coordinate position of a touched point.

The method of detecting a coordinate position by the touch panel 100 of the second embodiment will be explained with reference to FIG. 7.

First, a capacitive sensing mode is selected (step S102). Concretely, as shown in FIG. 15, the switch 133 connected to the upper transparent conductive layer 110 is closed to have the potential of the upper transparent conductive layer 110 at a potential provided by the power source 132. At this time, the switch 151 may be opened and the switch 152 may be closed.

Then, a coordinate position of a touched point is detected by the capacitive sensing mode (step S104). Concretely, as shown in FIG. 16, the selection unit 360 selects the capacitive sensing units 440 to detect an electric potential status of the upper transparent conductive layer 110 so that a coordinate position by the capacitive sensing mode can be detected through the upper transparent conductive layer 110.

Then, the control unit 310 controls the determination of whether touching is detected by the capacitive sensing mode (step S106). Concretely, the control unit 310 controls the determination of whether touching is detected based on current values detected by the current detecting units 134. When it is determined that touching by the capacitive sensing mode is detected (Yes in step S106), the process proceeds to step S108. It means that the capacitive sensing mode is continuously selected while touching is detected.

When, on the other hand, it is determined that touching by the capacitive sensing mode is not detected in step S106 (No in step S106), the process proceeds to step S110.

In step S108, the control unit 310 calculates a coordinate position of the touched point by the capacitive sensing mode based on the current values detected by the current detecting units 134 and sends the calculated coordinate position to the host computer or the like.

In step S110, a resistive sensing mode is selected. In step S110, the conditions as shown in FIG. 13 and in FIG. 14 are performed alternately.

Concretely, as for one condition, as shown in FIG. 13, the switches 151 and 152 are respectively connected to the first terminal 151a and the third terminal 152a to generate a potential gradient on the lower transparent conductive layer 120 in the Y-axis direction.

Then, a coordinate position of a touched point is detected by the resistive sensing mode (step S112). Concretely, as shown in FIG. 16, the selection unit 360 selects the resistive sensing unit 450 to detect an electric potential status of the upper transparent conductive layer 110 so that a coordinate position by the resistive sensing mode can be detected through the upper transparent conductive layer 110.

As for another condition in step S110, as shown in FIG. 14, the switches 151 and 152 are respectively connected to the second terminal 151b and the fourth terminal 152b to generate a potential gradient on the lower transparent conductive layer 120 in the X-axis direction.

Then, the control unit 310 controls the determination of whether touching is detected by the resistive sensing mode (step S114). Concretely, the control unit 310 controls the determination of whether touching is detected based on an electric potential which is detected by the electric potential detecting unit 131. When it is determined that touching by the resistive sensing mode is detected (Yes in step S114), the process proceeds to step S116. It means that the resistive sensing mode is continuously selected while touching is detected.

When, on the other hand, it is determined that touching by the resistive sensing mode is not detected in step S114 (No in step S114), the process proceeds to step S102.

In step S116, the control unit 310 calculates a coordinate position of the touched point by the resistive sensing mode based on the potential detected by the electric potential detecting unit 131 under the condition as shown in FIG. 13 or in FIG. 14 and sends the calculated coordinate position to the host computer or the like.

As described above, a coordinate position of a touched point can be detected by using the touch panel 100 of the second embodiment. In the method of detecting the coordinate position, the touch panel for which any device composed of any material can be used for touching, and the coordinate position can be detected easily just by touching, can be used with a low cost.

According to the touch panel 100 of the embodiment, when detecting a coordinate position of a touched point by the resistive sensing mode, the upper transparent conductive layer 110 and the lower transparent conductive layer 120 are used while a coordinate position of a touched point by the capacitive sensing mode, only the upper transparent conductive layer 110 is used. It means that according to the touch panel 100 of the embodiment, the upper transparent conductive layer 110 is commonly used for the resistive sensing mode and the capacitive sensing mode. Therefore, the touch panel 100 of the embodiment can be made thinner with a lower cost compared with a case where two kinds of touch panels are stacked. It means that a touch panel capable of detecting a coordinate position just by touching as well as by using any material of a thinner and with a lower cost can be manufactured.

Further, as a number of transparent conductive layers can be reduced compared with the case where two kinds of touch panels are stacked, visibility can be improved.

Further, although the touch panel of the five-wire type is explained in this embodiment, a touch panel of a seven-wire type is also used for the embodiment. The structures and the functions of the touch panel 100 not especially explained in this embodiment as they are the same as those of the first embodiment.

As for the upper transparent conductive layer according to this embodiment, the upper transparent conductive layer composed of plural meshed areas as in the upper transparent conductive layer 210 or 260, explained in the first embodiment with reference to FIG. 8 to FIG. 10, may be used instead of the upper transparent conductive layer 110.

According to the embodiments disclosed herein, a thinner touch panel capable of detecting a coordinate position just by touching as well as by using any device of any material can be provided with a lower cost. Further, a method of detecting a coordinate position by such a touch panel can also be provided.

The present invention is not limited to the specifically disclosed embodiments, and variations and modifications may be made without departing from the scope of the present invention.

The present application is based on Japanese Priority Application No. 2011-15526 filed on Jan. 27, 2011, the entire contents of which are hereby incorporated herein by reference.

What is claimed is:

1. A touch panel comprising:
an upper conductive layer;
a lower conductive layer facing the upper conductive layer with an interval between the upper conductive layer;
a capacitive sensing unit that detects a coordinate position by a capacitive coupling under a condition where a predetermined electric potential is applied to the upper conductive layer; and
a resistive sensing unit that detects a coordinate position based on an electric potential at a position where the upper conductive layer and the lower conductive layer come into contact under a condition where a potential gradient is generated on either one of the upper conductive layer or the lower conductive layer.

2. The touch panel according to claim 1, wherein the resistive sensing unit includes
a first electric potential detecting unit that is connected to the upper conductive layer and that detects the potential of the upper conductive layer under a condition where a potential gradient is generated in a first direction on the lower conductive layer, and
a second electric potential detecting unit that is connected to the lower conductive layer and that detects the potential of the lower conductive layer under a condition where a potential gradient is generated in a second direction different from the first direction on the upper conductive layer.

3. The touch panel according to claim 2, further comprising a transparent substrate, the upper conductive layer being formed to be separated into plural areas including a first group of areas aligned in the first direction formed on one surface of the transparent substrate and a second group of areas aligned in the second direction perpendicular to the first direction formed on the other surface of the transparent substrate facing the lower conductive layer.

4. The touch panel according to claim 1, wherein the resistive sensing unit includes an electric potential detecting unit that is connected to the upper conductive layer and that detects the potential of the upper conductive layer under a condition where a potential gradient is generated in a certain direction on the lower conductive layer.

5. The touch panel according to claim 4, wherein the electric potential detecting unit detects an electric potential of the upper conductive layer under a first condition where a potential gradient is generated in a first direction on the lower conductive layer and under a second condition where a potential gradient is generated in a second direction different from the first direction on the lower conductive layer.

6. The touch panel according to claim 1, further comprising a transparent substrate, the upper conductive layer being formed to be separated into plural areas including a first group of areas aligned in a first direction and a second group of areas aligned in a second direction perpendicular to the first direction, wherein the first group of areas and the second group of areas are formed on a surface of the transparent substrate facing the lower conductive layer.

7. The touch panel according to claim 1, further comprising a transparent substrate, the upper conductive layer being formed to be separated into plural areas including a first group of areas aligned in a first direction formed on one surface of the transparent substrate and a second group of areas aligned in a second direction perpendicular to the first direction formed on the other surface of the transparent substrate facing the lower conductive layer.

8. The touch panel according to claim 1, wherein detection by the capacitive sensing unit and detection by the resistive sensing unit are performed at different timing.

9. The touch panel according to claim 1, wherein the capacitive sensing unit includes plural current detecting units provided to detect current values of the different positions of the upper conductive layer and the coordinate position is detected based on the current values detected by the plural current detecting units.

10. The touch panel according to claim 1, wherein the lower conductive layer is kept at a ground potential when detection by the capacitive sensing unit is performed.

11. A method of detecting a coordinate position by a touch panel including an upper conductive layer and a lower conductive layer facing the upper conductive layer with an interval between the upper conductive layer, comprising:
   detecting, by a capacitive sensing mode, a coordinate position by a capacitive coupling under a condition where a predetermined electric potential is applied to the upper conductive layer; and
   detecting, by a resistive sensing mode, a coordinate position based on an electric potential at a position where the upper conductive layer and the lower conductive layer contact under a condition where a potential gradient is generated on either one of the upper conductive layer and the lower conductive layer.

12. The method of detecting a coordinate position according to claim 11, wherein the step of detecting the coordinate position by the resistive sensing mode includes,
   detecting the electric potential of the upper conductive layer under a condition where a potential gradient is generated in a first direction on the lower conductive layer, and
   detecting the electric potential of the lower conductive layer under a condition where a potential gradient is generated in a second direction different from the first direction on the upper conductive layer.

13. The method of detecting a coordinate position according to claim 11, wherein the step of detecting the coordinate position by the resistive sensing mode includes detecting the electric potential of the upper conductive layer under a condition where a potential gradient is generated in a certain direction on the lower conductive layer.

14. The method of detecting a coordinate position according to claim 11, wherein the step of detecting the coordinate position by the resistive sensing mode includes detecting an electric potential of the upper conductive layer under a first condition where a potential gradient is generated in a first direction on the lower conductive layer and under a second condition where a potential gradient is generated in a second direction different from the first direction on the lower conductive layer.

15. The method of detecting a coordinate position according to claim 11, wherein the step of detecting the coordinate position by the resistive sensing mode and the step of detecting the coordinate position by the capacitive sensing mode are repeatedly performed.

16. The method of detecting a coordinate position according to claim 11, wherein when touching is not detected in the step of detecting the coordinate position by the resistive sensing mode, the process moves to the step of detecting the coordinate position by the capacitive sensing mode.

17. The method of detecting a coordinate position according to claim 11, wherein when touching is not detected in the step of detecting the coordinate position by the capacitive sensing mode, the process moves to the step of detecting the coordinate position by the resistive sensing mode.

18. The method of detecting a coordinate position according to claim 11,
   wherein in the detecting the coordinate position by the capacitive sensing mode, a coordinate position in a first direction and a coordinate position in a second direction are detected by applying the predetermined electric potential only to the upper conductive layer, the first direction being different from the second direction, and
   wherein the detecting the coordinate position by the resistive sensing mode, includes
      detecting a coordinate position in the first direction based on an electric potential at a position where the upper conductive layer and the lower conductive layer contact under a condition where a potential gradient is generated on one of the upper conductive layer and the lower conductive layer, and
      detecting a coordinate position in the second direction based on an electric potential at a position where the upper conductive layer and the lower conductive layer contact under a condition where a potential gradient is generated on the other of the upper conductive layer and the lower conductive layer.

19. A method of detecting a coordinate position by a touch panel including an upper conductive layer and a lower conductive layer facing the upper conductive layer with an interval between the upper conductive layer, comprising:
   performing a capacitive sensing by only using the upper conductive layer to detect a coordinate position by a capacitive coupling under a condition where a predetermined electric potential is applied to the upper conductive layer; and
   performing a resistive sensing including
      detecting a coordinate position in a first direction based on an electric potential at a position where the upper conductive layer and the lower conductive layer contact under a condition where a potential gradient is generated on one of the upper conductive layer and the lower conductive layer, and
      detecting a coordinate position in a second direction based on an electric potential at a position where the upper conductive layer and the lower conductive layer contact under a condition where a potential gradient is generated on the other of the upper conductive layer and the lower conductive layer, the first direction being different from the second direction.

20. The method of detecting a coordinate position according to claim 19,
   wherein in the performing the capacitive sensing, the coordinate position in the first direction and the coordinate position in the second direction are detected by applying the predetermined electric potential only to the upper conductive layer.

* * * * *